United States Patent [19]

Geiser

[11] Patent Number: 4,921,213
[45] Date of Patent: May 1, 1990

[54] VALVE SLIDE

[75] Inventor: Friedrich Geiser, Nüziders, Austria

[73] Assignee: Vat Holding AG, Haag/SG, Switzerland

[21] Appl. No.: 404,897

[22] Filed: Sep. 8, 1989

[30] Foreign Application Priority Data

Sep. 14, 1988 [DE] Fed. Rep. of Germany ....... 3831249

[51] Int. Cl.⁵ .............................................. F16K 3/18
[52] U.S. Cl. .................................... 251/328; 251/326
[58] Field of Search ......................... 251/333, 326, 328

[56]     References Cited
     U.S. PATENT DOCUMENTS

| 1,135,280 | 4/1915 | Hamilton | 251/328 |
| 4,531,539 | 7/1985 | Jandrasi et al. | 251/326 |
| 4,809,950 | 3/1989 | Geiser | 251/326 |

Primary Examiner—John Rivell
Assistant Examiner—L. R. Leo
Attorney, Agent, or Firm—Toren, McGeady & Associates

[57] ABSTRACT

A valve slide includes a slide housing and defines a slide passage opening. The slide passage opening is closable by a closing member which is slidable in the plane of the slide. A sealing surface surrounds the slide passage opening. In the closed position of the closing member, a circumferentially closed sealing member rests against the sealing surface. Imaginary straight generatrices of the sealing surface extend at a right angle to the plane in which the axis of the slide and the sliding direction of the closing member are located. In the direction of the generatrices of the sealing surfaces, the sealing surface has an upper portion, a middle portion and a lower portion. The upper portion and the lower portion each include an obtuse angle with the middle portion. The planes of the upper portion and the lower extend approximately perpendicularly to the sliding direction of the closing member. At least the components of the sealing member which interact with the middle portion of the sealing surface extend along straight lines and parallel to that plane which includes the axis of the slide and the direction of sliding of the closing member.

9 Claims, 3 Drawing Sheets

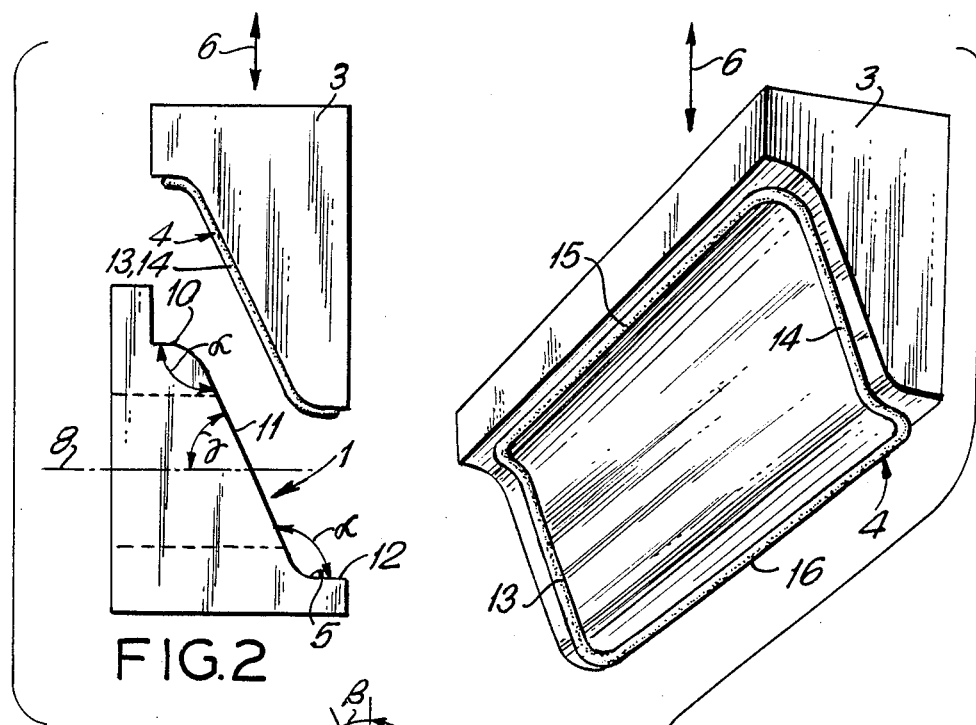
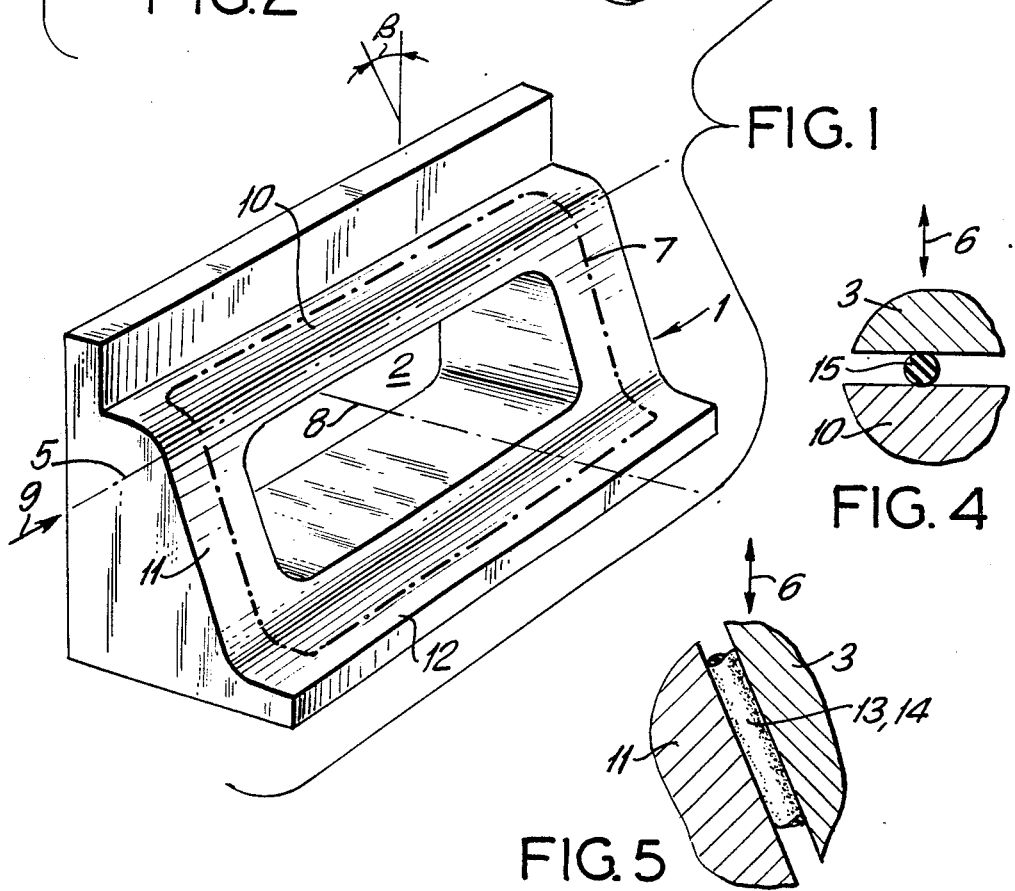
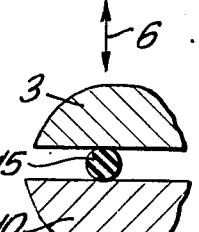
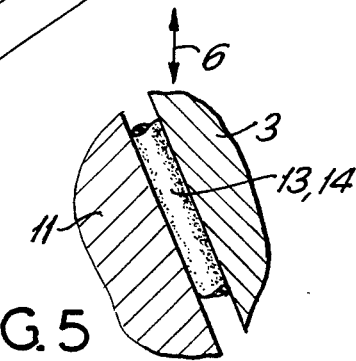
FIG. 1
FIG. 2
FIG. 4
FIG. 5

VALVE SLIDE

BACKGROUND OF THE INVENTION

1. Field of the Invention

The present invention relates to a valve slide with a slide housing and a slide passage opening. The slide passage opening is closable by means of a closing member which is slidable in the plane of the slide. A sealing surface is provided surrounding the slide passage opening. In the closed position of the closing member, a circumferentially closed sealing member whose shape corresponds to the sealing surface rests against the sealing surface and the imaginary straight generatrices of the sealing surface extend at a right angle to the plane in which the axis of the slide and the sliding direction of the closing member are located.

2. Description of the Related Art

Several types of construction of such valve slides are known. They are usually constructed as so-called wedge-type slides. The slides are called wedge-type slides because the cross-section of the closing member is wedge-shaped defining an acute angle. Valve slides of this type are very useful in many technical applications, especially where the requirements with respect to tightness are not very high.

A closing slide of the above-described type is disclosed in Austrian patent No. 352,491. The slide includes a wedge-shaped closing member which is enclosed with an elastic material. Slides of this type are used in water pipes. The wedge-shaped closing member is surrounded by a rubber-elastic envelope or coating which completely covers the closing member. This envelope or coating has a relatively great wall thickness. When the closing slide is closed, this thick-walled rubber member is forced by the closing member into the passage opening of the slide and the closing effect is ensured by the capability of this thick-walled rubber member to change its shape. This rubber member rests laterally against the wall of the passage opening of the greatest portion of its circumference. A flat, arc-like curved shoulder is provided in the upper portion of the passage opening. A part in the upper portion of the thick-walled rubber envelope projecting in axial direction of the passage opening rests on the shoulder when the slide is closed. Slides of this type are of very simple construction and can certainly perform the function for which they are intended in water pipes because, as already mentioned, the thick-walled rubber envelope is capable of changing its shape and can be pressed into the passage opening of the slide, so that the opening is tightly closed. Of course, such slides close tightly in water pipes. Slides of this type cannot be used in vacuum plants.

U.S. Pat. No. 3,565,393 discloses a plate-type slide which is used for closing a rectangular passage opening. A circumferential groove is provided in the cross-sectional plane of this passage opening in which the slide plate is moved. An elastic material for forming a sealing member is cast into the groove. A corresponding, slot-like recess is provided in the upper part of this sealing member for passing the plate-shaped closing member therethrough. A gap is provided between the wall of the groove and the cast, elastically deformable material. When the slide plate has been moved in, an excess pressure is built up in the gap by means of a pressurized gas or a pressurized liquid. The excess pressure presses the elastic material against the edges of the slide plate in order to ensure a sealing action of the plate in this manner.

Finally, the closing slide disclosed in German patent No. 33 90 493 should be mentioned. This closing slide is a slide of classical construction. When the slide is moved in and the components which perform the sealing action contact each other, the circumferentially closed sealing member which surrounds the passage opening is acted upon by a transverse load which acts in the plane of the sealing member and which squeezes the sealing member over the greatest portion of its circumference.

Constructions of this type cannot be used successfully in vacuum plants which is due to the particular type of load acting on the sealing member. When the closing member is moved into its closed position, from the moment when the sealing member touches the sealing surface and when the closing member is moved in further, a load acts on the greatest portion of the circumference of the sealing member transversely of the longitudinal direction. This load is a shearing load because the sealing member is fastened unilaterally on the closing member in some manner and the closing member moves during the closing procedure transversely of the sealing surface. If the sealing surface is uneven, even when this unevenness is microscopically small, the sealing member is damaged and the slide is no longer tight as required by vacuum technology. Microscopically small openings between the spaces to be sealed are already "holes" which may have a size which is a multiple of the size of gas molecules.

It is, therefore, the primary object of the present invention to further develop the known and proven valve slide construction in such a way that the load acts on the valve slide in a more favorable manner, i.e., the sealing member or its components are compressed only transversely of the axis thereof, or the sealing member or its components are stretched in the direction of the longitudinal axis thereof.

SUMMARY OF THE INVENTION

In accordance with the present invention, seen in the direction of the generatrices of the sealing surface, the sealing surface has an upper portion, a middle portion and a lower portion, wherein the upper portion and the lower portion each include an obtuse angle with the middle portion. The planes of the upper portion and of the lower portion of the sealing surface extend approximately perpendicularly to the direction of displacement of the closing member. Moreover, at least the components of the circumferentially closed sealing member which interact with the middle portion of the sealing surface extend along straight lines and parallel to that plane which includes the axis of the slide and the direction of sliding of the closing member.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

BRIEF DESCRIPTION OF THE DRAWING

In the drawing:

FIG. 1 is a perspective view of the sealing surface and the closing member of a valve slide, shown without housing and actuating members, the sealing surface and the closing member being shown apart from each other and slightly turned relative to each other, so that the parts which provide the sealing action are visible;

FIG. 2 is a side view of the components shown in FIG. 1;

FIGS. 4 and 5 are illustrations of details of the sealing member

DESCRIPTION OF THE PREFERRED EMBODIMENT

Figure 3:
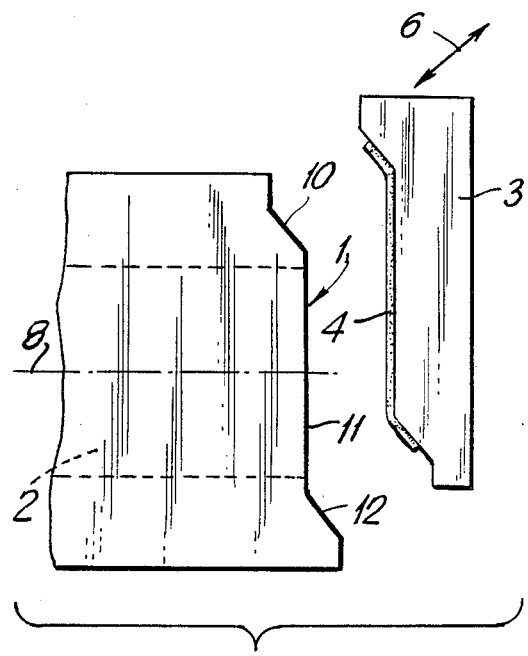
FIG. 3 is a side view, similar to FIG. 2, of another embodiment of the valve slide according to the present invention.

FIG. 1 of the drawing shows the components of a valve slide which provide the sealing action. The components are shown in an exploded prospective view, with the two components being turned relative to each other, so that the parts which provide the sealing action are visible. Thus, the sealing surface 1 with the slide passage opening 2 is turned relative to the closing member 3 with the circumferentially closed sealing member 4. The sealing surface 1 which surrounds the passage opening 2 is formed by straight generatrices 5, one of which is shown by a dash-dot straight line. The sliding direction 6 of the closing member 3 is indicated by a double arrow. The dash-dot line 7 on the sealing surface 1 illustrates the location or the line of contact of the sealing member 4 of the closing member 3 when the closing member is in its closed position.

As can be seen from FIG. 1, the imaginary family of straight generatrices 5 of the sealing surface 1 extend perpendicularly to the plane which includes the axis 8 of the slide and the sliding direction 6 of the closing member 3. FIG. 1 further shows that, in the direction of this plurality of straight generatrices 5 as indicated by arrow 9, the sealing surface 1 has an upper portion 10, a middle portion 11, and a lower portion 12. This can best be seen in FIG. 2 which shows the components of FIG. 1 in a side view.

As illustrated in FIG. 2, the upper portion 10 and the lower portion 12 each include an obtuse angle $\alpha$ with the middle portion 11. The middle portion 11, on the other hand, includes in this embodiment an angle $\beta$ with the sliding direction 6 of the closing member 3. The sliding direction 6, in turn, extends essentially perpendicularly to the surfaces of the upper portion 10 and the lower portion 12 of the sealing surface. Another significant feature shown in FIG. 2 is that the portions 13 and 14 of the circumferentially closed sealing member 4 which interact with the middle portion 11 of the sealing surface 1 extend along straight lines and parallel to that plane which includes the axis 8 of the slide and the sliding direction 6 of the closing member 3 which, in the illustration of FIG. 2, is parallel to the plane of the drawing.

The upper and the lower portions 10 and 12 of the sealing surface 1 extend parallel to each other and also to the axis 8 of the slide. The upper portion 10, the middle portion 11, and the lower portion 12 of the sealing surface 1 have different lengths measured transversely to the family of imaginary generatrices 5 of the sealing surface 1. The middle portion 11 is longer than the two other portions 10 and 12. The lengths of the portions 10, 11 and 12 can be seen in FIG. 2 since these lengths extend in the plane of the drawing.

FIG. 2 further shows that, as already mentioned, the sliding direction 6 of the closing member 3 extends essentially perpendicularly to the plane of the upper and lower portions 10 and 12 of the sealing surface 1. In FIG. 2, these planes extend perpendicularly to the plane of the drawing.

In the embodiment of the present invention schematically illustrated in FIGS. 1 and 2, the middle portion 11 of the sealing surface 1 is inclined to include an acute angle $\gamma$ with the axis 8 of the slide and the sliding direction 6 includes a right angle with the portions 10 and 12. The advantages which can be obtained in the slide shown in FIGS. 1 and 2 can also be obtained in an embodiment which is schematically illustrated in FIG. 3 and corresponds to the illustration of FIG. 2. In the embodiment of FIG. 3, the middle portion 11 of the sealing surface 1 extends perpendicularly to the axis 8 of the slide and the upper and lower portions 10 and 12 of the sealing surface include an acute angle with the axis 8. The sliding direction 6 is also in this embodiment perpendicular to the planes of the upper and lower portions 10 and 12 of the sealing surface 1 and the planes of the upper and lower portions 10 and 12 also extend perpendicularly to the drawing plane.

While the upper and lower portions 15 and 16 of the sealing member 4 extend along straight lines in the embodiment shown in FIG. 1, it should be noted that it is not essential for the invention that these portions 15 and 16 extend along a straight line. These portions 15 and 16 can also be arc-shaped or differently shaped within their planes. Advantageously, the sealing member 4 is embedded in a groove and is provided opposite this groove. However, for clarity's sake, this has not been shown in the drawings.

The valve slide according to the present invention constructed as described above and schematically illustrated in the drawing has the following principal advantage. When the slide is closed, i.e., when the closing member 3 is moved in its sliding direction 6 against the sealing surface 1 until the sealing member 4 rests on the sealing surface 1, a load acts on the upper and lower portions 15 and 16 of the sealing member 4 exclusively transversely of the longitudinal direction thereof, as illustrated in FIG. 4. During this sliding movement, i.e., when the slide is closed, the load acting on the portions 13 and 14 of the sealing member 4 acts in the direction of the longitudinal direction thereof, as illustrated in FIG. 5, so that transverse loads on the sealing member 4 can practically be eliminated over the entire length thereof. The desired load application on the portions 13 and 14 of the sealing member 4 requires that these portions have the described shape, i.e., that they extend along straight lines and parallel to that plane which includes the axis 8 of the slide and the sliding direction 6 of the closing member 3, while the desired load applications on the portions 15 and 16 of the sealing member are independent of their shape in the plane of the portions 10 and 12 of the sealing surface 1.

Figure 6:
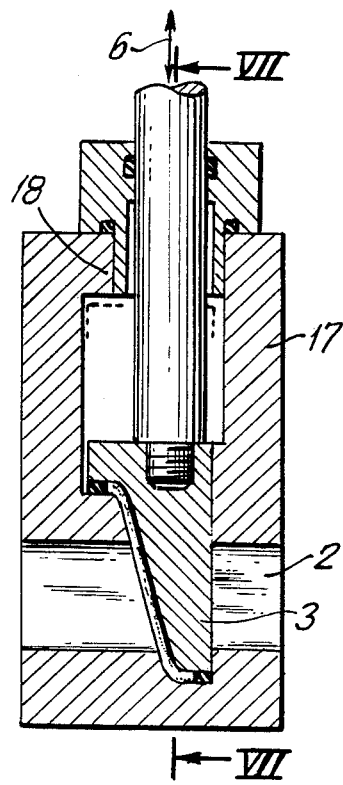
FIG. 6 is a longitudinal sectional view of a valve slide.

A valve slide which includes the above-described structural features is illustrated in a longitudinal sectional view in FIG. 6. The plane of FIG. 6 includes the axis 8 of the slide. Since the above-described construction is primarily used for slides which have a slot-like, elongated passage opening 2, as shown in FIG. 1, the slide housing 17 may be manufactured from a continuously extruded section. This section having the desired shape; as shown in FIG. 6 is cut to the necessary length, is closed at the end surface with closing plates 19 and, after the closing member 3 has been inserted, a valve cover 18 is placed on top and fastened by means of screws. It is only necessary to work the passage opening 2 into the extruded section, wherein the axis of the passage opening extends transversely to the manufacturing direction of the continuously extruded section.

Figure 8:
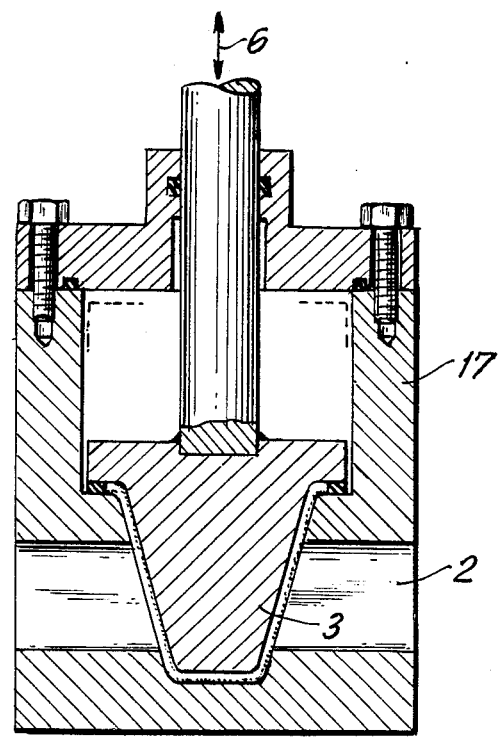
FIG. 8 is a longitudinal sectional view of another embodiment of the valve slide.
Figure 7:
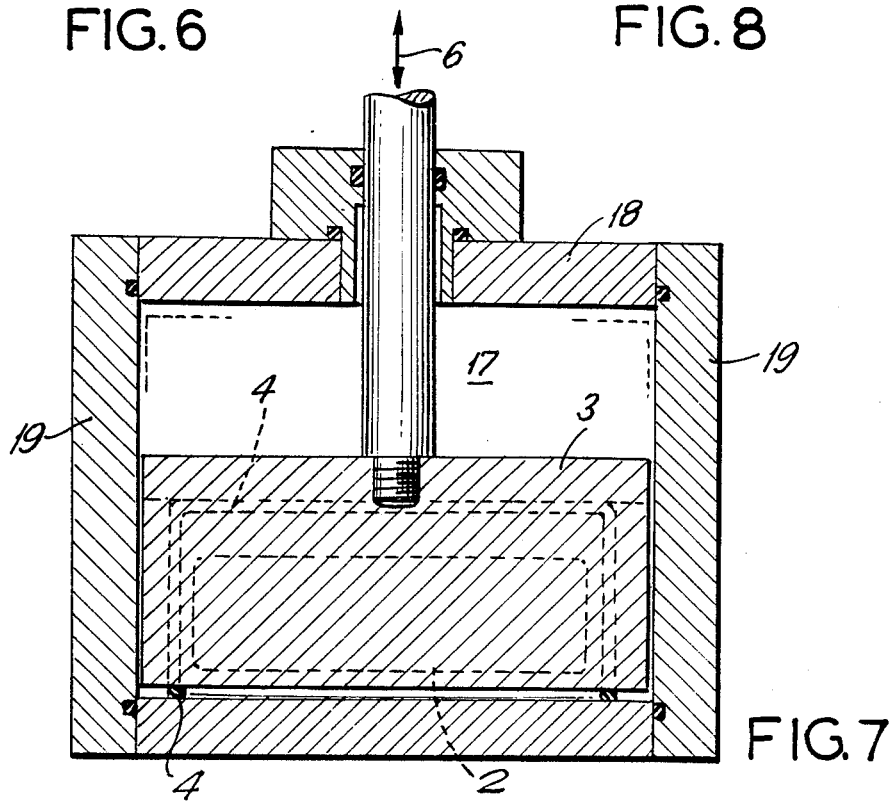
FIG. 7 is a cross-sectional view of the valve slide of FIG. 6.

FIG. 8 of the drawing is a longitudinal sectional view of another embodiment of the invention. This embodiment differs from the embodiments described above in that, relative to the sliding direction 6 of the closing member and to a middle plane extending perpendicularly to the drawing plane, which middle plane includes the closing direction, the slide is constructed symmetrically. Also in this case, the housing 17 and the closing member 3 can be manufactured from continuously extruded sections, wherein into this section, after having been cut to the correct size, it is only necessary to work the passage opening 2. The end surfaces of this section piece are also closed with closing plates, as they are shown in the illustration of FIG. 7.

Figure 9:
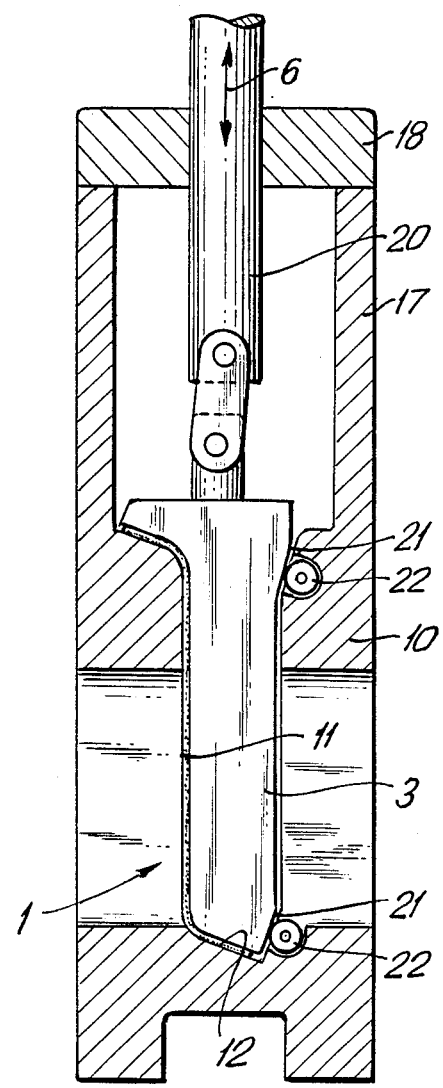
FIG. 9 is also a longitudinal sectional view of another embodiment of the invention.

FIG. 9 of the drawing shows an embodiment of the slide whose construction is shown in principle in FIG. 3. The closing member 3 is attached to the push rod 20 in an articulated manner. On its side facing away from the sealing member 4, the closing member 3 has upper and lower inclined edges 21 which rest against roller members supported in housing 17. When the closing member 3 is moved into its closed position by moving the push rod 20 downwardly, the edges 21 make contact with the roller members and force the closing member 3 to carry out a movement in a direction which is inclined, so that, also in this case, the upper and lower portions 15 and 16 of the sealing member 4 move perpendicularly against the corresponding portions 10 and 12 of the sealing surface 1.

In the embodiment shown in FIG. 9, the portions 13 and 14 of the sealing member 4 which extend from top to bottom also are acted upon with a load only in longitudinal direction.

In the illustrated embodiments the slide passage opening 2 has the shape of a slot. However, the invention can also be used successfully in valve slides in which the passage opening has a different cross-sectional shape, for example, round or oval.

While specific embodiments of the invention have been shown and described in detail to illustrate the application of the inventive principles, it will be understood that the invention may be embodied otherwise without departing from such principles.

I claim:

1. In a valve slide including a slide housing and defining a slide passage opening, a closing member slidable in the plane of the slide into a closed position for closing the slide passage opening, a sealing surface being provided surrounding the slide passage opening, wherein, in the closed position of the closing member, a circumferentially closed sealing member whose shape corresponds to the sealing surface rests against the sealing surface, imaginary straight generatrices of the sealing surface extending at a right angle to the plane in which the axis of the slide and the sliding direction of the closing member are located, wherein the improvement comprises that, in the direction of the generatrices of the sealing surface, the sealing surface has an upper portion, a middle portion and a lower portion, each portion defining a plane, the upper portion and the lower portion each including an obtuse angle with the middle portion, the planes of the upper portion and of the lower portion of the sealing surface extending approximately perpendicularly to the sliding direction of the closing member, the circumferentially closed sealing member having components which interact with the sealing surface, wherein at least the components of the sealing member which interact with the middle portion of the sealing surface extend along straight lines and parallel to that plane which includes the axis of the slide and the direction of sliding of the closing member.

2. The valve slide according to claim 1, wherein the upper portion and the lower portion of the sealing surface extend parallel to each other.

3. The valve slide according to claim 1, wherein the upper portion and the lower portion of the sealing surface extend parallel to the axis of the slide.

4. The valve slide according to claim 1, wherein, relative to a plane including the sliding direction of the closing member and located parallel to the straight generatrices of the sealing surface, the sealing surface, the sealing member and the closing member are constructed essentially symmetrically.

5. The valve slide according to claim 1, wherein the slide passage opening is a slot-like opening having a long axis, the long axis of the opening extending perpendicularly to the sliding direction of the closing member.

6. The valve slide according to claim 1, wherein the upper portion, the middle portion and the lower portion of the sealing surface have different lengths in a direction transversely to the straight generatrices of the sealing surface, wherein the middle portion is longer than the upper and lower portions.

7. The valve slide according to claim 1, wherein the middle portion of the sealing surface is arranged perpendicularly relative to the axis of the slide.

8. The valve slide according to claim 1, wherein the valve housing is an extruded section.

9. The valve slide according to claim 1, wherein the closing member is an extruded section.

* * * * *